(12) United States Patent
Roberge

(10) Patent No.: US 9,915,164 B2
(45) Date of Patent: Mar. 13, 2018

(54) GEARED TURBOFAN WITH HIGH SPEED GENERATOR

(71) Applicant: United Technologies Corporation, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 370 days.

(21) Appl. No.: 14/688,080

(22) Filed: Apr. 16, 2015

(65) Prior Publication Data

US 2015/0337677 A1 Nov. 26, 2015

Related U.S. Application Data

(60) Provisional application No. 62/000,572, filed on May 20, 2014.

(51) Int. Cl.
| | |
|---|---|
| *F01D 15/10* | (2006.01) |
| *F01D 25/02* | (2006.01) |
| *F02C 7/32* | (2006.01) |
| *F02C 7/36* | (2006.01) |

(Continued)

(52) U.S. Cl.
CPC ............. *F01D 15/10* (2013.01); *F01D 25/02* (2013.01); *F02C 3/107* (2013.01); *F02C 7/32* (2013.01); *F02C 7/36* (2013.01); *F02K 3/06* (2013.01); *F05D 2220/76* (2013.01); *F05D 2230/72* (2013.01); *F05D 2260/40311* (2013.01); *F05D 2260/60* (2013.01); *Y02T 50/671* (2013.01)

(58) Field of Classification Search
CPC .... F02C 7/32; F02C 7/047; F02C 7/04; F02C 7/36; F02C 3/107; F01D 25/02; F01D 15/10; F05D 2220/76; F05D 2220/766; B64D 15/00; B64D 15/12

See application file for complete search history.

(56) References Cited

U.S. PATENT DOCUMENTS

| | | | | |
|---|---|---|---|---|
| 2,827,760 A | * | 3/1958 | Marchant | ................ F01D 9/065 60/39.093 |
| 3,859,785 A | * | 1/1975 | Leto | ......................... F02C 7/32 416/146 A |

(Continued)

FOREIGN PATENT DOCUMENTS

| | | |
|---|---|---|
| DE | 102010049885 A1 | 5/2012 |
| EP | 2192291 A2 | 6/2010 |

(Continued)

OTHER PUBLICATIONS

European Search Report for European Application No. 15167636.8 completed Oct. 26, 2015.

*Primary Examiner* — Andrew Nguyen
(74) *Attorney, Agent, or Firm* — Carlson, Gaskey, & Olds, P.C.

(57) ABSTRACT

A gas turbine engine comprises a fan rotor, a lower speed compressor rotor and a higher speed compressor rotor, and a lower speed turbine rotor and a higher speed turbine rotor. The lower speed turbine rotor rotates the lower speed compressor rotor, and rotates a gear reduction to, in turn, rotate the fan rotor. The higher speed turbine rotor rotates the higher speed compressor rotor. An electrical generator is driven to rotate with one of the lower speed turbine rotor and the fan rotor.

12 Claims, 3 Drawing Sheets

(51) Int. Cl.
  *F02K 3/06*  (2006.01)
  *F02C 3/107*  (2006.01)

(56) References Cited

U.S. PATENT DOCUMENTS

| | | | |
|---|---|---|---|
| 6,259,166 B1 * | 7/2001 | Tommer | F01D 15/10 |
| | | | 290/4 R |
| 7,642,682 B1 * | 1/2010 | Matheny | F01D 15/10 |
| | | | 310/90 |
| 8,026,624 B2 * | 9/2011 | Beutin | F01D 15/10 |
| | | | 290/52 |
| 8,519,555 B2 | 8/2013 | Dooley et al. | |
| 2004/0255590 A1 | 12/2004 | Rago et al. | |
| 2008/0110151 A1 | 5/2008 | Welch et al. | |
| 2009/0293497 A1 * | 12/2009 | Cloft | F01D 21/045 |
| | | | 60/796 |
| 2010/0105516 A1 * | 4/2010 | Sheridan | F01D 25/18 |
| | | | 475/346 |
| 2010/0236216 A1 * | 9/2010 | Winter | F01D 21/00 |
| | | | 60/204 |

FOREIGN PATENT DOCUMENTS

| | | | | |
|---|---|---|---|---|
| GB | 628191 | * | 8/1949 | B64D 15/12 |
| WO | 2010067172 A2 | | 6/2010 | |

* cited by examiner

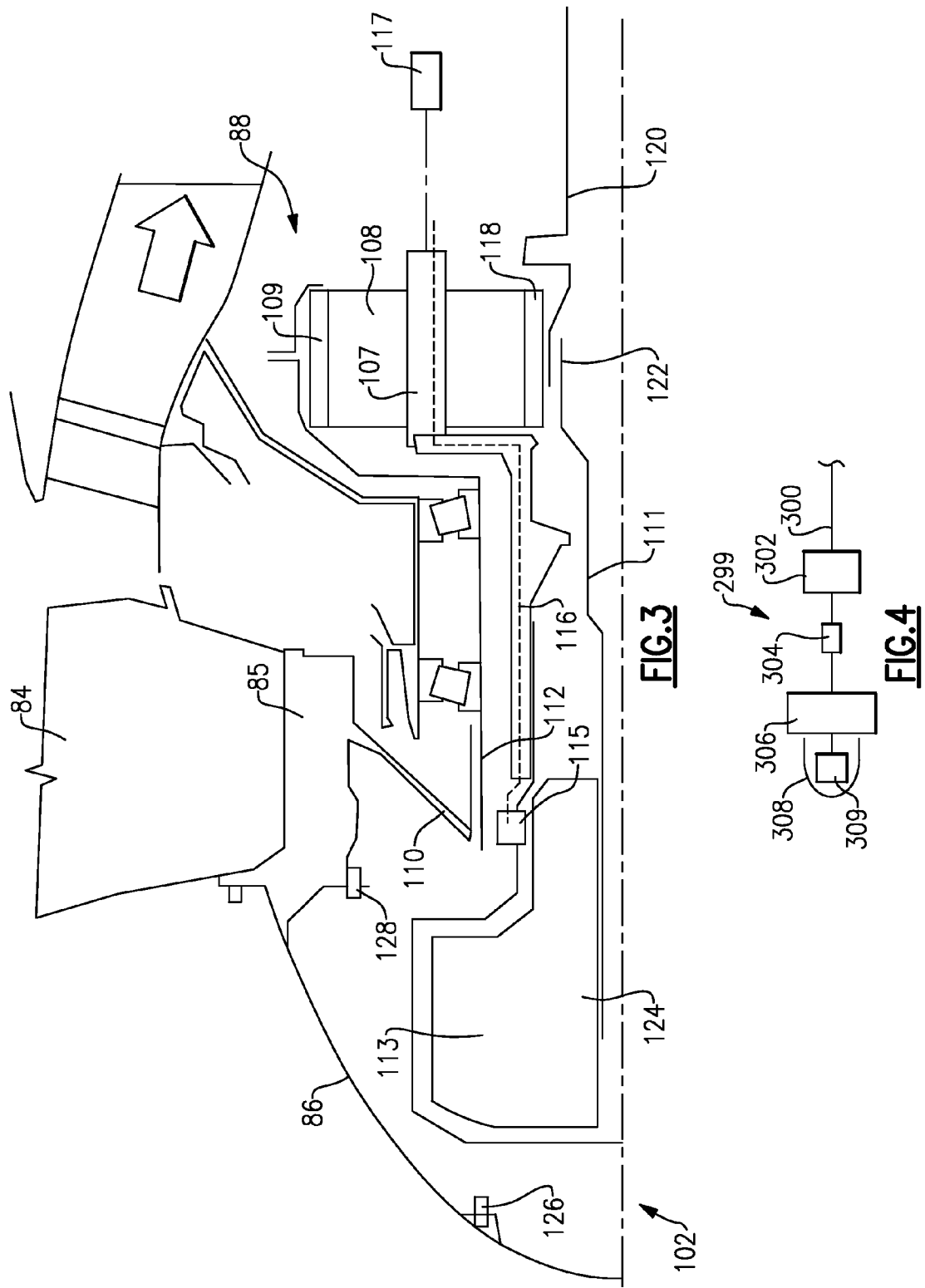

GEARED TURBOFAN WITH HIGH SPEED GENERATOR

CROSS-REFERENCE TO RELATED APPLICATION

This application claims priority to U.S. Provisional Patent Application No. 62/000,572, filed May 20, 2014.

BACKGROUND OF THE INVENTION

This application relates to a geared turbofan with a generator driven with a low pressure compressor.

Gas turbine engines are known and, typically, include a fan delivering air into a bypass duct as propulsion air, and further delivering air into a core engine. Air entering the core passes into a compressor section where it is compressed and delivered into a combustor. The air is mixed with fuel in the combustor and ignited. Products of this combustion pass downstream over turbine rotors driving them to rotate.

Historically, there has been a low speed spool and a higher speed spool. The low speed spool drove a first stage compressor along with the fan rotor. The speed of rotation of the fan was limited by various considerations and, thus, in this direct drive engine, the speed of the entire low speed spool had to be limited.

Generators are associated with gas turbine engines to generate electricity from the rotation of the spools. Generators may be associated with a high speed spool. It has also been proposed to utilize a generator driven by the low speed spool. However, since the speed of the low speed spool has been limited, the amount of power available from the generator driven by the low speed spool as a function of size and weight has been similarly limited.

More recently, it has been proposed to include a gear reduction between the fan and the first stage compressor.

SUMMARY OF THE INVENTION

In a featured embodiment, a gas turbine engine comprises a fan rotor, a lower speed compressor rotor and a higher speed compressor rotor, and a lower speed turbine rotor and a higher speed turbine rotor. The lower speed turbine rotor rotates the lower speed compressor rotor, and rotates a gear reduction to, in turn, rotate the fan rotor. The higher speed turbine rotor rotates the higher speed compressor rotor. A generator is driven to rotate with one of the lower speed turbine rotor and the fan rotor.

In another embodiment according to the previous embodiment, the generator is mounted in an exhaust nozzle.

In another embodiment according to any of the previous embodiments, the generator is mounted in a bearing compartment associated with the gear reduction.

In another embodiment according to any of the previous embodiments, the generator is located in a nose cone.

In another embodiment according to any of the previous embodiments, the generator is located in the nose cone forward of the fan rotor.

In another embodiment according to any of the previous embodiments, a power supply outlet from the generator passes through static structure included in the gear reduction.

In another embodiment according to any of the previous embodiments, the static structure includes journal pins, mounting intermediate gears in the reduction.

In another embodiment according to any of the previous embodiments, the low pressure turbine drives a sun gear in the gear reduction through a flexible input shaft.

In another embodiment according to any of the previous embodiments, the generator is driven to rotate with the lower speed turbine rotor.

In another embodiment according to any of the previous embodiments, a generator rotor is rotated by a generator shaft driven by the flexible input shaft.

In another embodiment according to any of the previous embodiments, the generator shaft is driven separately from the sun gear.

In another embodiment according to any of the previous embodiments, heat generated by the generator provides an anti-icing feature for the nose cone.

In another embodiment according to any of the previous embodiments, a power supply outlet from the generator passes through static structure included in the gear reduction.

In another embodiment according to any of the previous embodiments, the static structure includes journal pins, mounting intermediate gears in the reduction.

In another embodiment according to any of the previous embodiments, the nose cone is removable to provide access to the generator.

In another embodiment according to any of the previous embodiments, the low pressure turbine drives a sun gear in the gear reduction through a flexible input shaft.

In another embodiment according to any of the previous embodiments, heat generated by the generator provides an anti-icing feature for the nose cone.

In another embodiment according to any of the previous embodiments, the generator is driven to rotate with the fan rotor.

In another embodiment according to any of the previous embodiments, the generator is positioned forwardly of the fan rotor.

In another embodiment according to any of the previous embodiments, heat generated by the generator provides an anti-icing feature for the nose cone.

In another embodiment according to any of the previous embodiments,

These and other features may be best understood from the following drawings and specification.

BRIEF DESCRIPTION OF THE DRAWINGS

FIG. 3 shows a detailed view of one such location.
FIG. 4 shows a schematic alternative embodiment.

DETAILED DESCRIPTION

Figure 1:
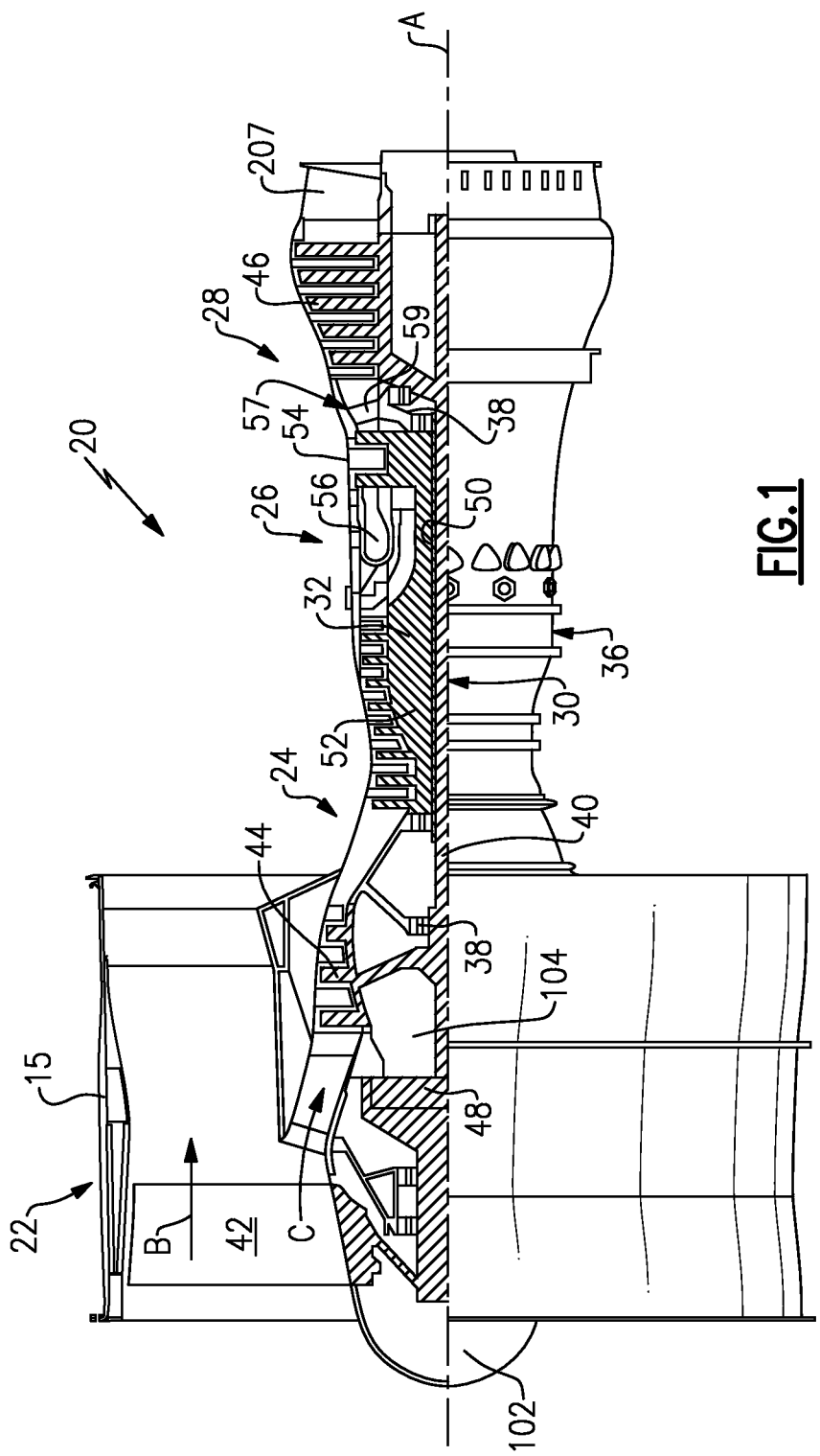
FIG. 1 shows a schematic of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
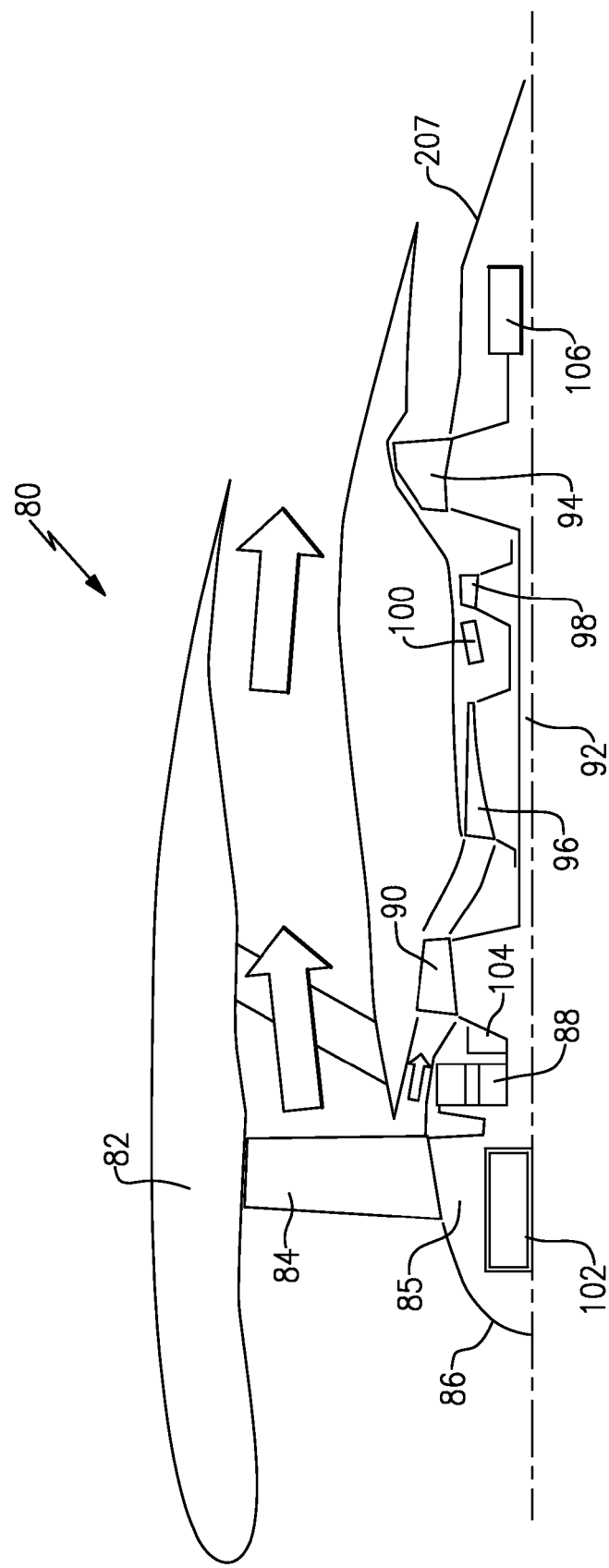
FIG. 2 shows the potential location for generators.

As depicted in FIG. 2, An engine 80, which may operate generally as the engine 20 of FIG. 1, includes a nacelle 82. A fan rotor 85 drives blades 84 to deliver bypass air into a bypass duct and further delivers core air to a low pressure compressor 90. Low pressure compressor 90 rotates with a shaft 92 and is driven by a high speed low pressure turbine 94. A gear reduction 88 is driven along with the shaft 92 and, in turn, drives the fan rotor 85 at a slower speed. A nose cone 86 rotates with the fan rotor 85.

A higher pressure compressor stage 96 is driven by a higher pressure turbine 98. A combustor 100 is positioned between compressor 96 and turbine 98.

A generator 102 is shown mounted within the nose cone 86. A chamber (or compartment) 104, which will typically include bearings for mounting structure of the gear reduction 88, may receive a generator as an alternative location to be driven by the high-speed low pressure turbine prior to the speed reduction provided by the gear reduction 88. Finally, a nozzle 207 may receive a generator 106 which is driven to rotate with the turbine 94. The locations 102, 104 and 207 are also shown schematically in FIG. 1.

FIG. 3 shows the generator 102 mounted in the nose cone 86. Fasteners 126 and 128 secure the nose cone 86 to rotate with a rotor 85 that rotates with fan blades 84. A hub 110 has a spline connection to be driven by the shaft 112 which is driven to rotate with a ring gear 109 in the gear reduction 88. A plurality of star gears 108 rotate about static journal pins 107. In other embodiments, the star gears 108 could be replaced by planet gears; generically, the two could be called intermediate gears. A sun gear 118 is driven to rotate through a spline connection with a flexible drive 120. The flexible drive 120 may further drive a shaft 111 through a spline connection to, in turn, drive a rotor portion 124 of the generator 102.

As known, a stator 113 is also included in the generator 102. A control 115 may control or condition the supplied electricity through one or more electrical conduits 116 extending through the journal pins 107, as an example. The wire extends to an output 117, which may have an associated usage within the gas turbine engine or associated aircraft.

Wire 116 provides a power supply outlet from the generator 102 that passes through static structure included in the gear reduction 88. The static structure, as disclosed, includes journal pins 107 mounting intermediate gears 108 in the gear reduction 88. Of course, other static structure may be used.

The location of the generators in the FIG. 2 embodiment all provides the beneficial supply of greater amounts of power, as the shaft 92, turbine 94, and compressor 90, all rotate at a higher speed than in direct drive gas turbine engines. Thus, the speed supplied to the generator locations 102, 104 and 106 are all greater than with direct drive gas turbine engines. Advantages in generator design including power per unit volume and power per unit weight may be realized and may be attractive for use in aerospace systems.

The location shown in FIG. 3, however, has additional benefits. It is known that a nose cone 86 may accumulate ice during operation. The generation of the electricity at the generator 102 supplies heat for an anti-icing (de-icing, or preventing icing) of the nose cone and may further be sufficiently close to the fan rotor such that it helps all or a portion of the fan blades 84.

The generator is also located forward of the fan rotor 84 to mount it more completely within the nose cone to improve this anti-icing. Moreover, this location optimizes the accessibility for maintenance, repair and servicing. The nose cone 86 is removable to provide access to the generator 102. As the generator rotor 124 will be rotating at a higher speed, a smaller volume, lighter weight generator may be utilized compared to the prior art generators driven by the slower rotating, low speed shaft.

Locating the generator adjacent the fan rotor 85 may also allow use of an existing lubrication system to cool the generator.

FIG. 4 shows an alternative embodiment 299, wherein a shaft 300 is driven with the lower speed turbine, and drives a lower speed compressor rotor 302. The shaft also drives a gear reduction 304 to in turn drive a fan rotor 306. A nose cone 308 is positioned forwardly of the fan rotor 306, and receives a generator 309, which may be generally structured and mounted, and operate much like the generator of the FIG. 3 embodiment, however, being driven at the lower speed of the fan rotor 306. While this embodiment will not gain the higher speed benefits as mentioned above, it will have other benefits, particularly when mounted in the nose cone 308.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan rotor;
    a lower speed compressor rotor and a higher speed compressor rotor, and
    a lower speed turbine rotor and a higher speed turbine rotor,
    said lower speed turbine rotor rotating said lower speed compressor rotor, and rotating a gear reduction to, in turn, rotate said fan rotor, and said higher speed turbine rotor rotating said higher speed compressor rotor;
    a generator driven to rotate with one of said lower speed turbine rotor and said fan rotor;
    wherein said generator is located in a nose cone; and
    wherein a power supply outlet from said generator passes through static structure included in said gear reduction.

2. The gas turbine engine as set forth in claim 1, wherein said generator is located in said nose cone forward of said fan rotor.

3. The gas turbine engine as set forth in claim 1, wherein said lower speed turbine rotor is connected to drive a sun gear in said gear reduction through a flexible input shaft.

4. The gas turbine engine as set forth in claim 3, wherein a generator rotor is rotated by a generator shaft driven by said flexible input shaft.

5. The gas turbine engine as set forth in claim 4, wherein said generator shaft is driven separately from said sun gear.

6. The gas turbine engine as set forth in claim 5, wherein heat generated by said generator provides an anti-icing feature for said nose cone.

7. The gas turbine engine as set forth in claim 1, wherein said static structure includes journal pins, mounting intermediate gears in said gear reduction.

8. The gas turbine engine as set forth in claim 1, wherein said nose cone is removable to provide access to said generator.

9. The gas turbine engine as set forth in claim 1, wherein heat generated by said generator provides an anti-icing feature for said nose cone.

10. The gas turbine engine as set forth in claim 1, wherein said generator is driven to rotate with said fan rotor.

11. The gas turbine engine as set forth in claim 1, wherein said generator is positioned forwardly of said fan rotor.

12. The gas turbine engine as set forth in claim 11, wherein heat generated by said generator provides an anti-icing feature for said nose cone.

* * * * *